United States Patent [19]
Abe

[11] Patent Number: 5,144,552
[45] Date of Patent: Sep. 1, 1992

[54] OPTICAL INFORMATION STORAGE MEDIUM HAVING GROOVES AND PITS WITH SPECIFIC DEPTHS, RESPECTIVELY

[75] Inventor: Michiharu Abe, Yokohama, Japan

[73] Assignee: Ricoh Company, Ltd., Tokyo, Japan

[21] Appl. No.: 698,353

[22] Filed: May 6, 1991

Related U.S. Application Data

[60] Continuation of Ser. No. 449,296, Dec. 5, 1989, abandoned, which is a division of Ser. No. 311,447, Feb. 14, 1989, abandoned, which is a continuation of Ser. No. 76,670, Jul. 23, 1987, abandoned.

[30] Foreign Application Priority Data

| Jul. 25, 1986 | [JP] | Japan | 61-175295 |
| Jul. 25, 1986 | [JP] | Japan | 61-175296 |
| Jul. 31, 1986 | [JP] | Japan | 61-180707 |

[51] Int. Cl.⁵ .......................... G11B 7/007; G11B 7/24
[52] U.S. Cl. ................... 369/275.4; 369/275.1; 369/275.3; 369/111; 369/277; 369/278; 369/279
[58] Field of Search ............ 369/275.1, 275.2, 275.3, 369/275.4, 277, 109, 284, 286, 278, 279, 111, 44.13; 346/135.1, 76 L

[56] References Cited

U.S. PATENT DOCUMENTS

| 3,919,697 | 11/1975 | Walker | 369/44.13 |
| 4,385,303 | 5/1983 | Akahira et al. | 369/275 |
| 4,586,173 | 4/1986 | Ando | 369/109 X |
| 4,587,648 | 5/1986 | Ando | 369/275 |
| 4,748,609 | 5/1988 | Yonezawa et al. | 369/44.13 |
| 4,924,455 | 5/1990 | Fujiie et al. | 369/44.21 |
| 4,949,331 | 8/1990 | Maeda et al. | 369/109 X |

FOREIGN PATENT DOCUMENTS

| 0178116 | 4/1986 | European Pat. Off. | 369/275 |
| 2321164 | 4/1977 | France | 369/109 |
| 58-41446 | 3/1983 | Japan | 369/109 |
| 58-102347 | 6/1983 | Japan | 369/275 |
| 59-101043 | 6/1984 | Japan | 369/109 |
| 59-207039 | 11/1984 | Japan | 369/275 |
| 60-164939 | 8/1985 | Japan | 369/275 |
| 2034097 | 5/1980 | United Kingdom | 369/109 |

Primary Examiner—Hoa Nguyen
Attorney, Agent, or Firm—Cooper & Dunham

[57] ABSTRACT

An optical information storage medium is used for recording optical information therein and reproducing optical information therefrom. The optical information storage medium includes parallel, concentric, or helical tracking guide grooves and information tracks defined between the tracking guide grooves. A preformat area composed of discrete pits is disposed on some of the information tracks. The tracking guide grooves and the preformat pits are defined in one surface of a transparent substrate, and a recording film capable of absorbing and reflecting light is disposed on said one surface of the transparent substrate. The ratio of the effective depth of the tracking guide grooves to the wavelength of a recording/reproducing laser beam within the transparent substrate is in a certain range, and the ratio of the effective depth of the preformat pits to the wavelength of the recording/reproducing laser beam within the transparent substrate is also in a certain range.

4 Claims, 9 Drawing Sheets

FIG. 18
(Parallel grooves)

FIG. 19
(Concentric grooves)

FIG. 20
(Helical grooves)

OPTICAL INFORMATION STORAGE MEDIUM HAVING GROOVES AND PITS WITH SPECIFIC DEPTHS, RESPECTIVELY

This is a continuation of application Ser. No. 449,296, filed Dec. 5, 1989 (abandoned) which in turn is a division of U.S. Pat. application Ser. No. 07/311,447 filed Feb. 14, 1989, which in turn is a continuation of Ser. No. 07/076,670 filed Jul. 23, 1987.

BACKGROUND OF THE INVENTION

The present invention relates to an optical information storage medium such as an optical disc, an optical tape, an optical card, or the like for recording optical information therein and reproducing optical information therefrom.

Figure 13:
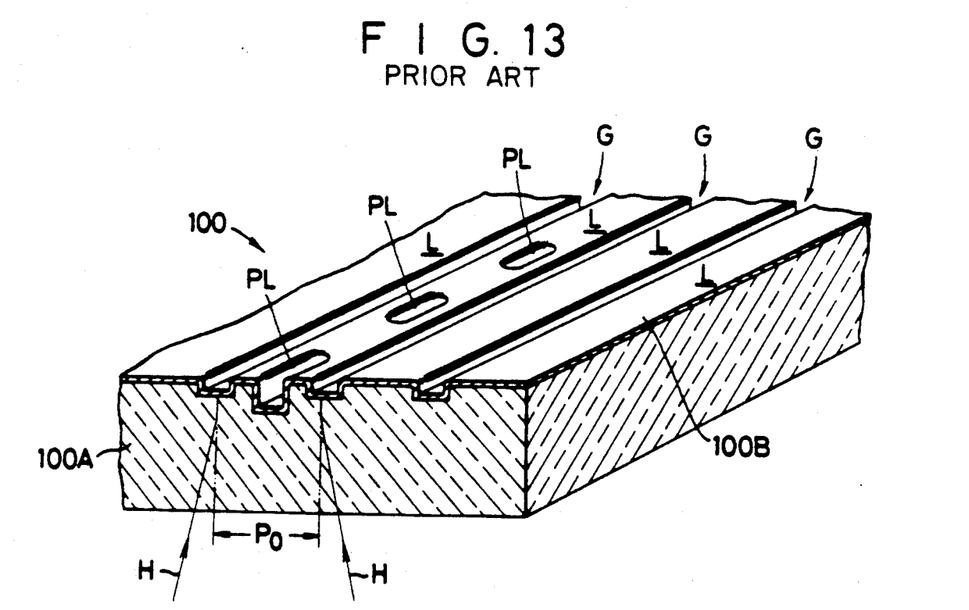
FIG. 13 is a fragmentary perspective view of a conventional optical information storage medium.

There are known optical information storage media comprising a transparent substrate having parallel, concentric, or spiral tracking guide grooves and information tracks disposed between adjacent ones of the guide grooves, the information tracks containing a preformat such as of address information in the form of discrete grooves or pits. The grooved surface of the optical information storage medium is coated with a light-absorbing/reflecting recording film. One such optical information storage medium is illustrated in FIG. 13 of the accompanying drawings.

The optical information storage medium, generally designated by the reference numeral 100, comprises a transparent substrate 100A and an optical recording film or layer 100B. The transparent substrate 100A has tracking guide grooves G defined in one surface thereof. The guide grooves G may be parallel, concentric, or spiral in shape dependent on the form of the optical information storage medium 100. Where the optical information storage medium 100 is disc-shaped, the guide grooves G are concentric or spiral. For the purpose of illustration only, the optical information storage medium 100 shown in FIG. 13 is in the shape of a disc, and the guide grooves G are concentric though they are shown as straight grooves.

Areas L between the guide grooves G are used as information tracks containing address information as a preformat in the form of discrete grooves or pits PL. The information tracks include pit-free flat areas referred to as lands.

The recording film 100B is capable of absorbing and reflecting light and is coated on the surface of the transparent substrate 100A in which the guide grooves G are defined. The recording film 100B may comprise a dye coated film, a dye evaporated film, a metallic film, a metal alloy film, a film of slightly oxidized product of metal, or the like. Optical information is recorded as small holes or phase changes of different reflectivities in the recording film in the lands of the information tracks L.

A laser beam H is applied through the transparent substrate 100A and focused on the recording film 100B for recording or reproducing optical information. No matter whether optical information is to be recorded on the storage medium or to be reproduced from the storage medium, the laser beam H must be properly guided on the information tracks. Control for guiding the laser beam along the information tracks is known as tracking control. Tracking control will briefly be described with reference to reproduction of recorded optical information.

Figure 14:
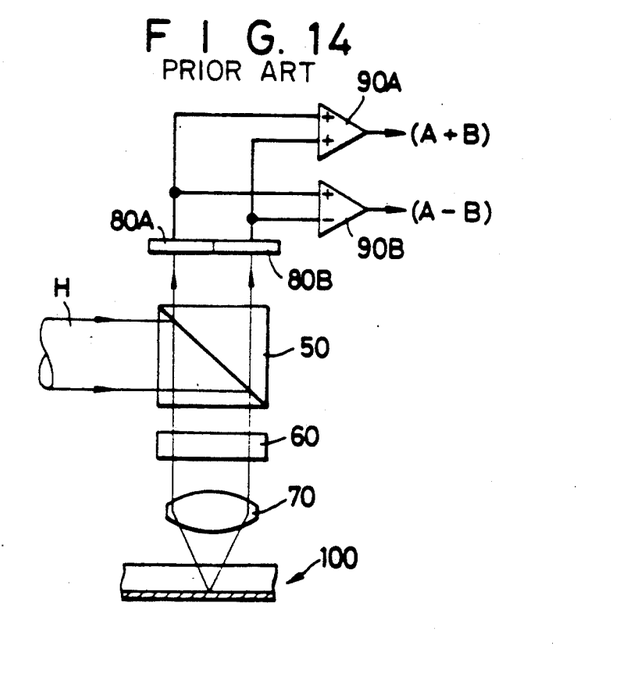
FIG. 14 shows a conventional optical pickup for laser beam recording and reproducing.

As shown in FIG. 14 of the accompanying drawings, the laser beam H emitted from a laser beam source is reflected downwardly by a deflecting prism 50 and passes through a quarter-wave plate 60 to an objective lens 70. The laser beam H is focused by the objective lens 70 onto the recording film through the transparent substrate of the optical information storage medium 100. A light beam reflected by the recording film travels through the objective lens 70, the quarter-wave plate 60, and the deflecting prism 50 and is applied to two light-detecting surfaces 80A, 80B of a light detector, which then produce photoelectrically converted output signals A, B that are applied to an analog adder 90A and an analog subtracter 90B. The light detector may comprise a PIN photodiode, for example.

The adder 90A produces an output signal indicative of (A+B), and the subtracter 90B produces an output signal indicative of (A−B). The output signal (A+B) from the adder 90A is an RF signal which is representative of the information recorded on the optical information storage medium 100. The output signal (A−B) is a tracking signal (more precisely, a tracking error signal). The tracking control is effected to move the laser beam relatively to the optical information storage medium under servo control so that the tracking signal will be zero.

Since the optical information storage medium has tracking guide grooves on its surface coated with the recording film, the reflected laser beam is subjected to a phase difference dependent on the position where it is reflected, resulting in an interference. The light-detecting surfaces 80A, 80B detect a far-field image of the interference of the reflected laser beam. A variation in the pattern of the far-field image is detected as the tracking signal.

Heretofore, a tracking control failure tends to occur in regions of the optical information storage medium 100 where the preformat is formed.

Generally, the pitch of guide grooves of the optical information storage medium and the spot diameter of the laser beam at the intensity that is $1/e^2$ of the maximum intensity are substantially equal, i.e., normally 1.6 micrometers. In this case, correct tracking control requires an accuracy of ±0.1 micrometer. The term "correct tracking" means tracking whereby the reduction in the intensity of the RF signal is small, the crosstalk is low, and the danger of the laser beam moving out of the information tracks is small.

The transparent substrate of the optical information storage medium is made of plastics. When the transparent substrate is fabricated of plastics according to the present fabrication technology, however, the transparent substrate is inevitably deformed slightly due for example to warpage or the like. During rotation of the optical information storage medium, it is tilted with respect to the optical axis of the optical pickup by up to about 40 minutes.

With the tilt of 40 minutes, a tracking signal produced from the preformat area by the tracking control system shown in FIG. 14 contains (a) an error ranging from 0.09 to 0.12 micrometer in the case of guide grooves and pits having a rectangular cross section that are difficult to form, or (b) an error ranging from 0.18 to 0.24 micrometer in the case of guide grooves of a V-shaped cross section that are relatively easy to form and pits of a rectangular cross section. The tracking servo control inherently suffers an error of about 0.03 micrometer. Therefore, the error in the preformat area, which is the sum of the error of the tracking signal and the error of the tracking servo control, is in excess of 0.1 micrometer which is an allowable error for the tracking control. As a result, no sufficient tracking accuracy is obtained, and a tracking control failure is liable to happen.

Figure 15:
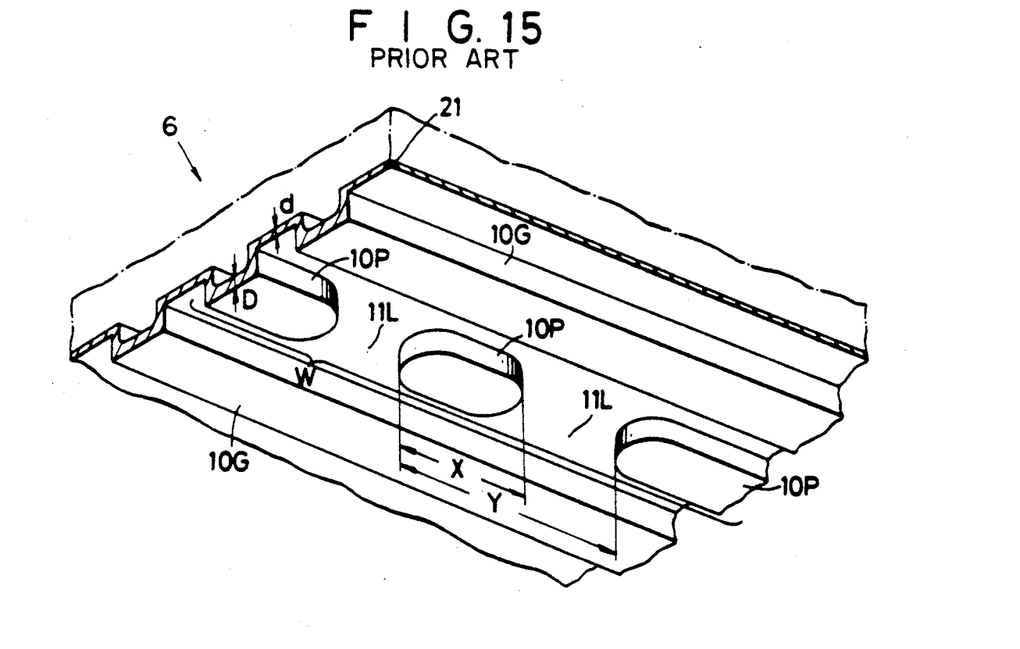
FIG. 15 shows a performat area of a conventional optical disk.
Figure 16:
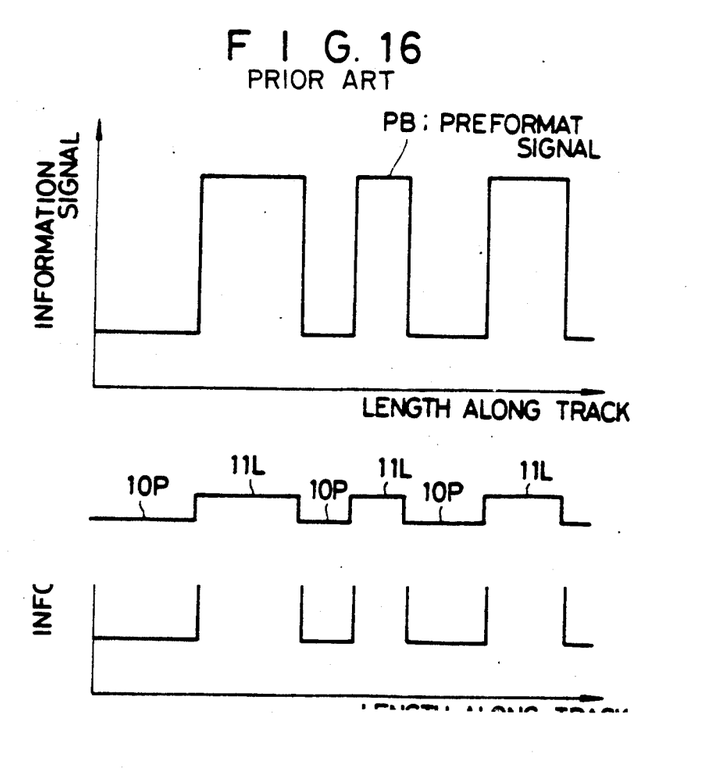
FIG. 16 shows performat signal levels produced from the preformat area shown in FIG. 15.

A tracking control failure in the preformat area is also caused in relation to the duty ratio in the preformat area. As shown in FIG. 15 of the accompanying drawings, an optical disc 6 of an optical disc device has a preformat area W in which an address signal, a synchronizing signal, and the like are recorded, the preformat area having pits 10P and lands 11L which are arranged alternately with each other. The duty ratio of the preformat area, i.e., the ratio of the length X of a pit 10P to the sum Y of the length X of the pit 10P and the length of an adjacent land 11 is about 50%. Where the beam spot is focused on the pits 10P, almost all light applied to the pits is diffracted, and the detected light reflected from the pits is of a weak intensity, with the consequence that the information signal detected as the sum signal is of a low level, as shown in FIG. 16. Where the beam spot is focused on the lands 11L, almost all light applied to the lands is reflected since the surface of the lands is of a mirror finish, and the level of the detected information signal is high. The successive high- and low-level signals serve as a preformat signal PB, which is better as the difference between the lower and higher levels is greater.

Figure 17:
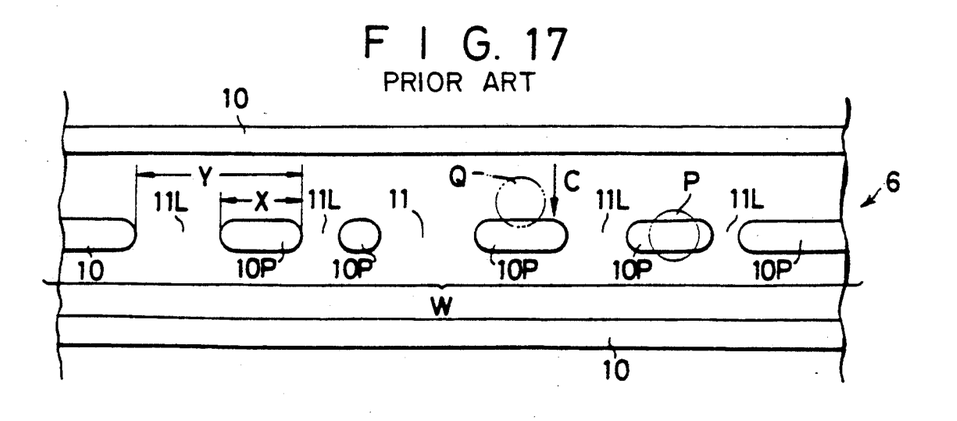
FIG. 17 shows a laser beam position and information tracks defined between the tracking guide grooves in a conventional way.

As illustrated in FIG. 17, when the beam spot is applied to a pit 10P in the preformat area W and focused as indicated as a solid-line spot P, no tracking error signal is produced since the light intensity difference is zero as described above. However, when the light beam is not focused as indicated as an imaginary-line spot Q, a tracking error signal is generated because the light intensity difference is not zero. If a tracking error signal is produced, the objective lens 70 (FIG. 15) is moved in the direction of the arrow C to focus the beam spot on the pit 10P.

In the case where the beam spot is applied to a land 11L in the preformat area W, if the applied beam is perpendicular to the disc surface, then no tracking error signal is produced since there is no difference between the intensities of light detected by the light-detecting surfaces 80A, 80B. If the optical disc 6 is tilted due to warpage, then the reflected light travels in different directions, causing light intensities detected by the light-detecting surfaces 80A, 80B to differ from each other even when the beam spot is not deviated from the track, so that a tracking error signal is produced. When this happens, the beam spot is moved by the servo control system regardless of the fact that the beam spot is in a proper position. Inasmuch as the duty ratio is about 50% in the preformat area, i.e., the length of the land 11L and the length of the pit 10P are substantially equal to each other in the preformat area, the tracking error signal is so much apt to suffer a greater error.

Japanese Laid-Open Patent Publication No. 61-5453 discloses an arrangement in which the error of a tracking error signal is reduced by selecting the duty ratio of the preformat area to be 75% or more, i.e., X/Y × 100 > 75 (%). The disclosed arrangement is however limited to a certain system for modulating a preformat signal, and is not suitable for other modulation systems such as FM, MFM, 2-7 modulation, M2 modulation, 8-10 conversion, 4-5 conversion, and the like.

Where the recording film or layer 21 of metal, alloy, or dye capable of absorbing and reflecting light is coated using a solvent, the recording film or layer 21 has a thickness D at the grooves and a thickness d at the lands, as shown in FIG. 15. Since the recording film 21 at the lands is thicker than at the grooves, the lands are more susceptible to deterioration upon exposure to a laser beam.

The recording film deposited in a groove has a shape which is not identical to the shape of the groove defined in the transparent substrate, because the recording film in the groove fails to have sharp corners comprementary to those of the groove, but tends to have dull or blunt corners.

SUMMARY OF THE INVENTION

It is therefore an object of the present invention to provide an optical information storage medium which will eliminate a tracking control failure in areas where a preformat is formed, so that information tracks can accurately be followed.

Another object of the present invention is to provide an optical information storage medium wherein the information signal in a preformat area is maintained at a constant level, stable tracking is allowed, and the optical recording layer is prevented from deterioration.

An optical information storage medium according to the present invention has a transparent substrate and a recording film. The transparent substrate has grooves defined in one surface thereof. The grooves include tracking guide grooves and preformat pits.

Figure 18:
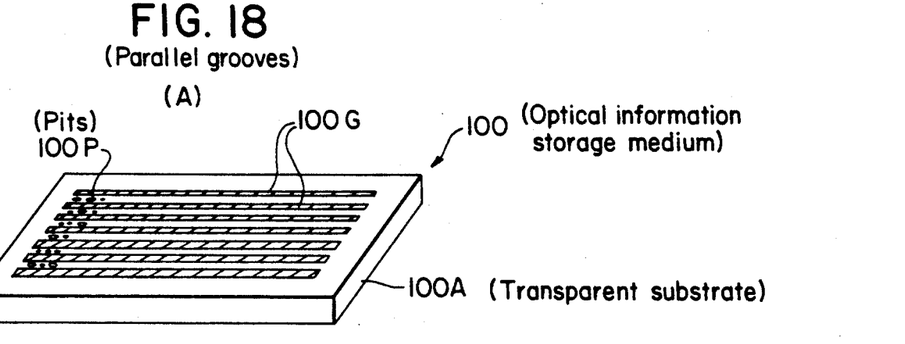
Figure 19:
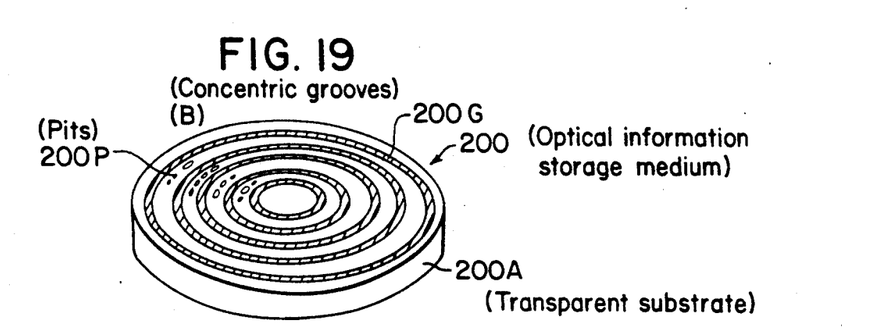
Figure 20:
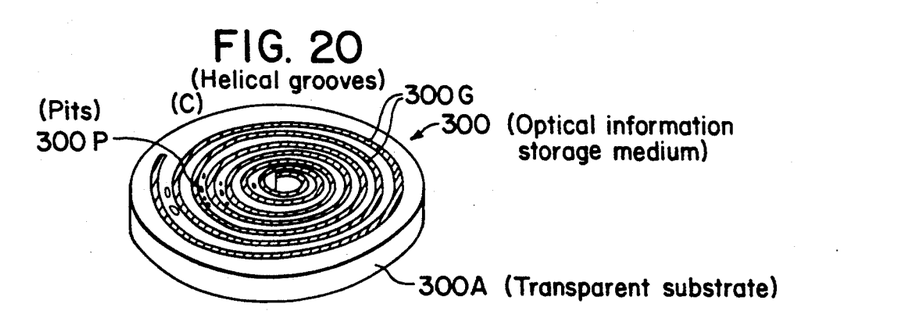

The tracking guide grooves are parallel, concentric, or helical (see, for example, FIGS. 18, 19 & 20 respectively), and information tracks are defined between the tracking guide grooves. Some of the information tracks have the preformat pits which are defined as discrete pits storing address information, for example, as a preformat.

The recording film is capable of absorbing and reflecting light and is disposed on the surface of the transparent substrate in which the grooves are defined. Optical information is recorded as small holes or phase changes of different reflectivities in the recording film. A recording/reproducing laser beam is applied to the recording film through the transparent substrate.

Assuming that the recording/reproducing laser beam has a wavelength $\lambda$ in the transparent substrate, $\lambda = \lambda o/n$ where $\lambda o$ is the wavelength in vacuum and n is the refractive index of the transparent substrate.

A first arrangement of the invention for eliminating a tracking control failure in the preformat area is to select the effective depth of the guide grooves to be 0.125 through 0.25 times the wavelength of the recording/reproducing laser beam, and to select the effective depth of the preformat pits to be 0.5 to 1 times the depth of the guide grooves. The wavelength of the recording/reproducing laser beam referred to above is of a value in the transparent substrate, but not in vacuum.

The manner in which a tracking control failure occurs in the preformat area of the conventional optical information storage medium as shown in FIG. 13 will be described below. The inventor has found, as a result of research activities regarding the problem of a tracking control failure, that the polarity of a tracking signal from preformat pits is opposite to that of a tracking signal from the lands, and such polarity inversion is a cause of a tracking control failure.

As shown in FIG. 13, the pitch Po of the tracking guide grooves G is usually made equal to the diameter of the focused spot of the recording/reproducing laser beam at the $1/e^2$ intensity. The pitch Po is in the range of from 1.2 to 2.5 micrometers, and preferably about 1.6 micrometers.

The width (half width) of the guide grooves G and the preformat pits PL is preferably 0.1 to 0.5 times the diameter of the focused laser beam spot in view of the tracking signal, the output characteristics of the preformat information signal, and the production process.

If the groove width, the pitch Po, and the diameter of the focused spot of the recording/reproducing laser beam meet the above relationship, then the laser beam H can simultaneously be applied to two adjacent guide grooves G (see FIG. 13), and the bottom of the guide grooves G serves as one reference plane.

With the conventional optical information storage medium, the preformat pits PL (e.g., address pits) are deeper than the guide grooves G as shown in FIG. 13. Since the bottom of the pits PL projects beyond the reference plane toward the laser beam, a diffraction pattern obtained upon application of the recording/reproducing laser beam is a pattern produced when grooves that are convex with respect to the laser beam are exposed to the laser beam. When the laser beam is applied to the lands or flat portions of the information track L, a diffraction pattern produced upon application of the laser beam to grooves that are concave with respect to the laser beam is obtained since the lands are lower than the reference plane with respect to the laser beam. Accordingly, the diffraction pattern generated by the preformat pits is different from the diffraction pattern generated by the lands, and hence the tracking signals produced from the pits and the lands are opposite in polarity.

In the preformat area, the pits PL and the lands L alternate with each other. Therefore, the tracking signals produced from the preformat area alternate between opposite polarities and are cancelled by each other, resulting in a reduced average tracking signal. Tracking control is rendered unstable due to disturbances such as warpage or tilting of the optical information storage medium, whereby a tracking control failure may be developed.

According to the present invention, the depth of the preformat pits PL is smaller than the depth of the guide grooves G in order to prevent the tracking signal from becoming opposite in polarity. The depth of the guide grooves is required to be smaller than $\frac{1}{4}$ of the wavelength $\lambda$ of the laser beam for generating a tracking signal, and is in the range of from $0.125\lambda$ to $0.25\lambda$ according to the present invention.

The depth of the preformat pits and tracking guide grooves, herein referred to, is an effective depth which is compensated for any dullness or bluntness of the cross-sectional shape of the tracking guide grooves and pits. Where the cross section of the tracking guide grooves or pits is V-shaped and the effective depth thereof is $\lambda/4$, the peak depth thereof is about 1.4 times the effective depth.

The pitch of the tracking guide grooves is in the range of from 1.2 to 2.5 micrometers, and is preferably about 1.6 micrometers (about the same as the diameter of the focused laser beam spot at the $1/e^2$ intensity). The groove width (half width) is preferably 0.1 to 0.5 times the focused laser beam spot at the $1/e^2$ intensity.

Another arrangement for preventing a tracking control failure in the preformat area is as follows:

The effective depth of the guide grooves in the optical information storage medium is 0.075 to 0.20 times the wavelength $\lambda$. The effective depth of the preformat pits is 0.26 to 0.45 times the wavelength $\lambda$.

The pitch of the tracking guide grooves is generally about 1.6 micrometers (or may range from 1.2 to 2.4 micrometers), i.e., is about the same as the diameter of the focused laser beam spot at the $1/e^2$ intensity.

Tracking servo control may be effected by displacing an objective lens, tilting light applied to the objective lens with a galvanometer mirror, moving an optical pickup, or moving the optical information storage medium itself in a direction normal to the tracking guide grooves. Any of these tracking servo control methods may be employed with the optical information storage medium of the present invention.

An arrangement for effecting stable tracking and preventing deterioration of the optical recording film while keeping information signals from the preformat area at a constant level is as follows:

The pits in the preformat area are interconnected by guide grooves in the preformat area. These interconnecting guide grooves have an effective width which is 0.2 to 0.7 times the effective depth of the pits, and a half width which is $\frac{1}{8}$ to 1 times that of the pits, so that the polarity of a tracking signal from the pits will be the same as that of a tracking signal from the interconnecting guide grooves.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
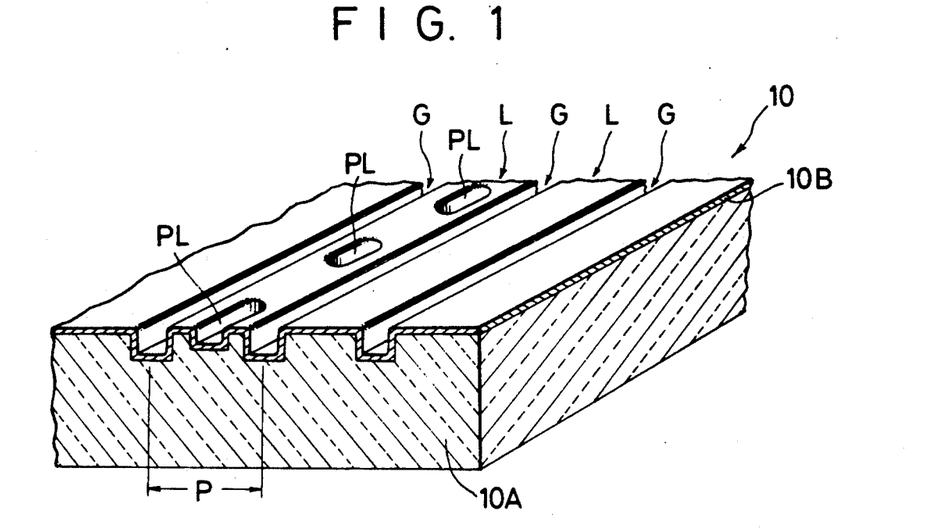
FIG. 1 is a fragmentary perspective view of an optical information storage medium according to an embodiment of the present invention.

FIG. 1 shows an optical information storage medium according to an embodiment of the present invention. The optical information storage medium, generally designated by the reference numeral 10, comprises a transparent substrate 10A and an optical recording film or layer 10B capable of absorbing and reflecting light, the recording film 10B being deposited on one surface of the transparent substrate 10A. The optical information storage medium 10 has tracking guide grooves G defined in the surface of the transparent substrate 10A which is covered with the recording film 10B, the guide grooves G being spaced apart with information tracks L present therebetween. The optical information storage medium 10 also has preformat grooves or pits PL defined in some of the information tracks L. The guide grooves G are spaced apart at a pitch P. Each of the guide grooves G and the pits PL is of a rectangular cross section, and the rectangular cross-sectional shape has sharp corners and is free of dull or blunt corners.

Figure 2:
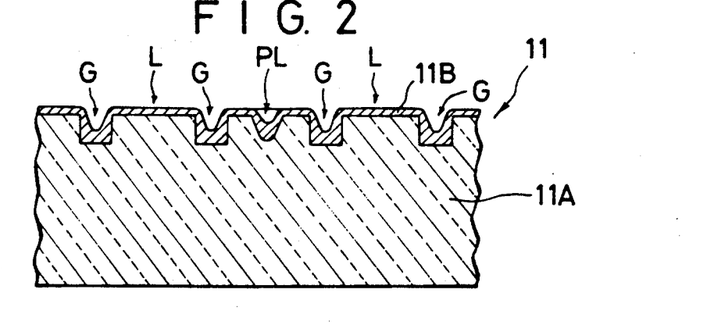
FIG. 2 is a fragmentary cross-sectional view of an optical information storage medium according to another embodiment of the present invention.

FIG. 2 illustrates an optical information storage medium 11 according to another embodiment of the present invention. The optical information storage medium 11 comprises a transparent substrate 11A and a recording medium 11B and has tracking guide grooves G, information tracks L, and preformat pits PL. The guide grooves G have a rectangular cross section, and the preformat pits PL have a cross-sectional shape free of sharp corners, i.e., a semielliptic shape produced by cutting off an elliptic shape along its minor axis. Where the recording film 11B comprises a dye coated film, it tends to be thicker in the guide grooves G and the pits PL.

Figure 3:
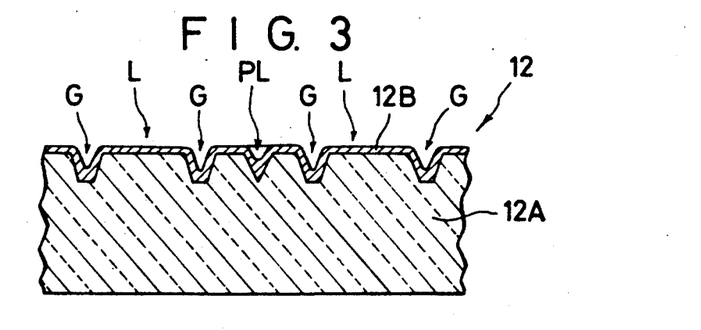
FIG. 3 is a fragmentary cross-sectional view of an optical information storage medium according to still another embodiment of the present invention.

According to still another embodiment of the present invention, an optical information storage medium 12 comprises a transparent substrate 12A and a recording medium 12B and has tracking guide grooves G of a trapezoidal cross section, information tracks L, and preformat pits PL of a V-shaped cross section. The recording film 12B deposited as a dye coated film makes the corners of the guide grooves G and the preformat pits PL dull or blunt. In case an optical information storage medium is fabricated in an ordinary process, it is most likely to have a configuration as shown in FIG. 2.

In each of the embodiments shown in FIGS. 1 through 3, the pits PL are less deep than the guide grooves G.

Figure 4:
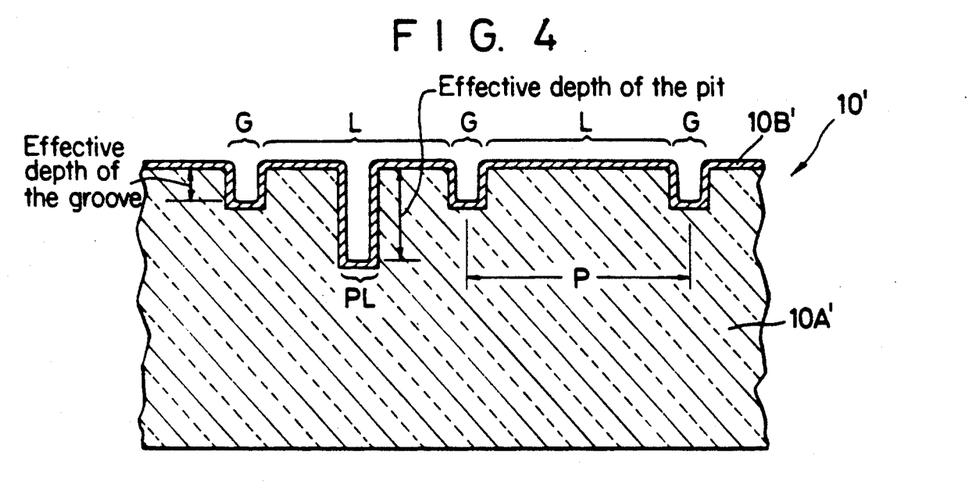
FIG. 4 is a fragmentary cross-sectional view of an optical information storage medium according to yet still another embodiment of the present invention.

FIG. 4 shows an optical information storage medium according to yet still another embodiment of the present invention. The optical information storage medium, denoted at 10', comprises a transparent substrate 10'A and an optical recording film of layer 10'B. The optical information storage medium 10' has tracking guide grooves G of a rectangular cross section, information tracks L present between the guide grooves G, and preformat grooves or pits PL defined in some of the information tracks L, the pits PL having a rectangular cross section. The guide grooves G are spaced apart at a pitch P which is about 1.6 micrometers that is equal to the diameter of the focused spot of a laser beam at the $1/e^2$ intensity which is applied to the optical information storage medium for recording information thereon and reproducing information therefrom.

Figure 5:
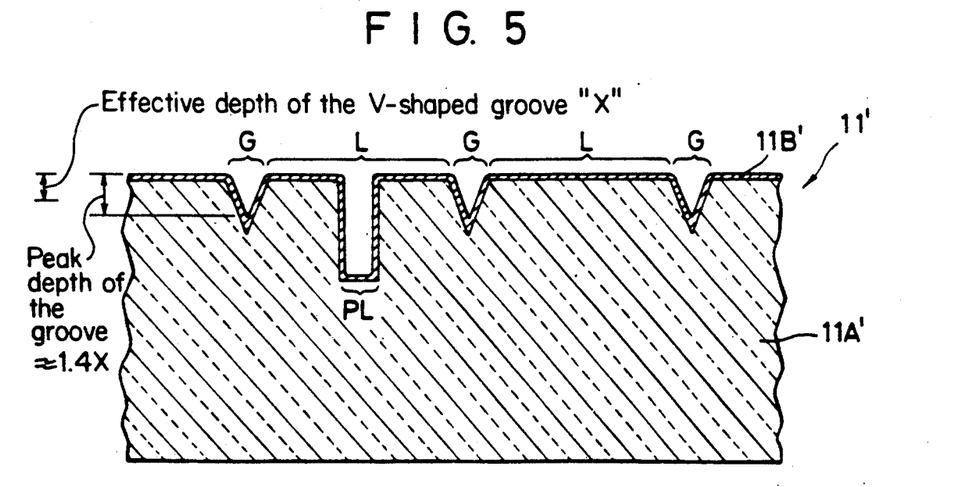
FIG. 5 is a fragmentary cross-sectional view of an optical information storage medium according to a further embodiment of the present invention.

FIG. 5 shows an optical information storage medium according to a further embodiment of the present invention. The optical information storage medium, denoted at 11', comprises a transparent substrate 11'A and an optical recording film or layer 11'B. The optical information storage medium 11' has tracking guide grooves G of a triangular or V-shaped cross section, information tracks L present between the guide grooves G, and preformat grooves or pits PL defined in some of the information tracks L, the pits PL having a rectangular cross section. The guide grooves G are spaced apart at a pitch P which is about 1.6 micrometers. The V-shaped guide grooves G may be formed as a result of dullness or bluntness, i.e., dull or blunt corners of the recording film 11'B deposited in rectangular grooves defined in the transparent substrate 11'A or dullness or bluntness, i.e., dull or blunt corners of the transparent substrate 11'A which are formed in defining guide grooves therein.

The guide grooves G and pits PL of a rectangular cross section as shown in FIG. 4 are actually difficult to fabricate. In reality, dull or blunt corners inclined at an angle ranging from 10° to 85° are formed in the preformat pits PL.

The optical information storage medias 10', 11' shown in FIGS. 4 and 5 are disc-shaped with the guide grooves G arranged along concentric circles.

In the optical information storage media 10, 11, the guide grooves G have an effective depth in the range of from $0.075\lambda$ to $0.20\lambda$ and the pits PL have an effective depth in the range of from $0.26\lambda$ to $0.45\lambda$ where $\lambda$ is the wavelength of the recording/reproducing laser beam in the transparent substrate. The effective depth of a groove is a depth compensated for a cross-sectional shape, such as of a V, of the groove which results from the formation of dull or blunt corners. For example, where a V-shaped groove has an effective depth of X, it has a peak depth of about 1.4X.

The recorded information can be reproduced from the optical information storage medium as shown in FIGS. 4 and 5 can be reproduced by the optical pickup as illustrated in FIG. 14. When the optical pickup is moved transversely across information tracks, the RF signal (A+B) and the tracking signal (A−B) vary as shown in FIG. 6.

Figure 6:
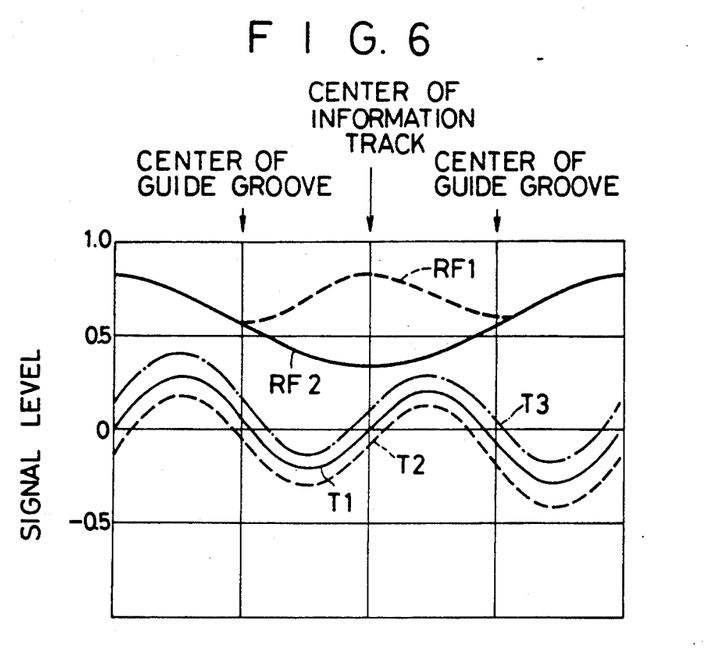
FIG. 6 is a graph showing signal levels produced from the optical information storage medium shown in FIGS. 4 and 5.

In FIG. 6, curves T1, T2, T3 represent tracking signals and indicate average values in preformat areas where lands and pits are mixed at a ratio of 1:1. The curve T1 indicates a tracking signal in the case the optical information storage medium is not tilted, and the curves T2, T3 indicate tracking signals in the case the optical information storage medium is tilted. It can be seen that the tracking signal can be offset by inclination or tilting of the optical information storage medium with respect to the optical axis of the optical pickup.

In FIG. 6, an RF signal RF1 is generated from the lands, whereas an RF signal RF2 is generated from the preformat pits. The preformat information can thus be represented by RF1 as a high level signal and RF2 as a low level signal.

It is important that the zero-crossing point of the tracking signal be not deviated from the center of the information track irrespective of how the optical information storage medium may be tilted. If the tracking signal were offset to the extent that no zero-crossing point would be present, then the information track could not be followed under tracking servo control.

Figure 8:
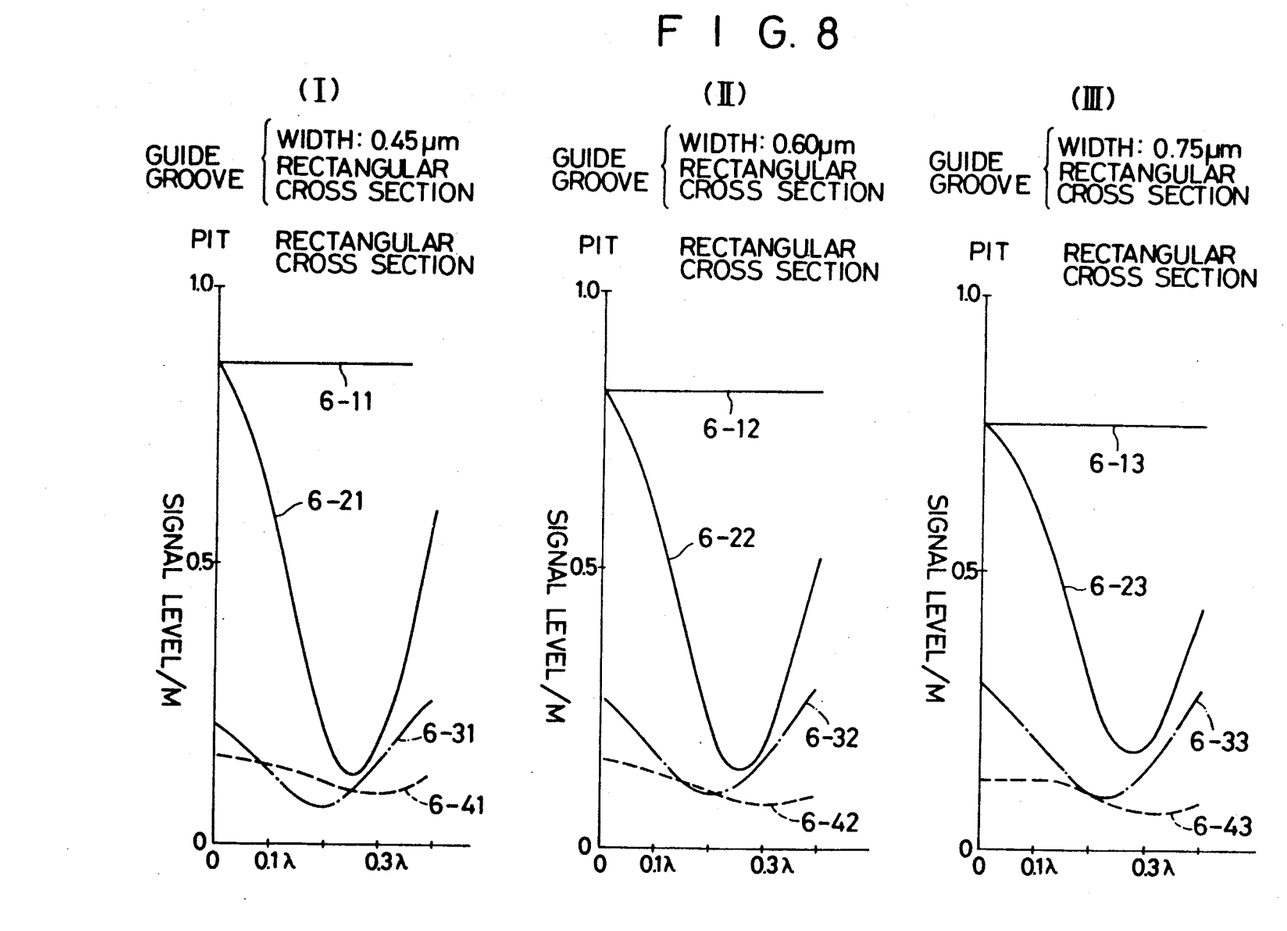
FIG. 8 shows signal levels produced from the optical information storage medium shown in FIG. 1.

FIG. 8 shows how various signals vary in level if the depth of pits are changed in the range of from $0\lambda$ to $0.4\lambda$ with respect to the optical information storage medium as shown in FIG. 1 in which the guide grooves G and pits PL have a rectangular cross section. The transparent substrate used is made of PMMA (polymethyl methacrylate), and the recording film used comprises a dye coated film capable of absorbing and reflecting light, the dye coated film having an average thickness of 650Å. The pitch of the guide grooves is 1.6 micrometers, and the diameter of the focused spot of the recording/reproducing laser beam at the $1/e^2$ intensity is also 1.6 micrometers. The recorded signal is read out through the optical pickup as shown in FIG. 14. The recording/reproducing laser beam is emitted from a semiconductor laser, the laser beam having a wavelength of 790 nm. The vertical axes of FIG. 8 represent a signal level/M where M is the reflection level of a mirror.

In FIG. 8(I), the guide grooves have a width of 0.45 micrometer, and the pits have a width which varies from 0.24 to 0.48 micrometer as their depth becomes greater. The straight curve 6-11 indicates an RF signal produced from the lands. The curve 6-21 represents an RF signal produced from the preformat pits. The curve 6-31 indicates ½ of the peak-to-peak value of a tracking signal upon traversing the preformat. The curve 6-41 indicates the offset value of a tracking signal when the disc-shaped optical information storage medium is tilted 1.43° with respect to the optical axis of the optical pickup.

FIG. 8(II) shows signal levels obtained under the same conditions as those of FIG. 8(I) except that the guide grooves G have a width of 0.60 micrometer. The curves 6-12, 6-22, 6-32, 6-42 correspond respectively to the curves 6-12, 6-22, 6-32, 6-42 of FIG. 8(I).

FIG. 8(III) shows signal levels obtained under the same conditions as those of FIG. 8(I) except that the guide grooves G have a width of 0.75 micrometer. The curves 6-13, 6-23, 6-33, 6-43 correspond respectively to the curves 6-12, 6-22, 6-32, 6-42 of FIG. 8(I).

It is assumed that ½ of the peak-to-peak value of the tracking signal upon traversing the preformat, i.e., the signal indicated by the curves 6-31, 6-32, 6-33, is referred to as a TP signal, and the offset value of the tracking signal, indicated by the curves 6-41, 6-42, 6-43, is referred to simply as an offset value. As the TP signal is greater than the offset value, the tracking signal is better and deviation from the information track is less caused. At this time, the information track can be tracked near its center.

FIG. 8(I), (II), (III) clearly shows that where the pit depth ranges from $0.1\lambda$ to $0.25\lambda$, the tracking signal is highly likely to be affected by the tilting of the optical information storage medium. The tracking signal becomes stable if the pit depth ranges from $0.26\lambda$ to $0.4\lambda$. Where the pit depth is below $0.1\lambda$, the tracking signal is also stable, but the contrast between the RF signals from the lands and the pits is so low that they are practically useless. The RF signals from the lands and the pits in the preformat area should differ largely from each other, but should not excessively deviate from each other in order to prevent crosstalk between adjacent tracks. The contrast between the RF signals from the lands and the pits is preferably in the range of from 0.3 to 0.7.

Where the guide grooves G are relatively shallow, they tend to become V-shaped in cross section because of dullness or bluntness, as shown in FIG. 5. Where the guide grooves G are relatively deep, they tend to become rectangular or trapezoidal in cross sectional shape.

Figure 7:
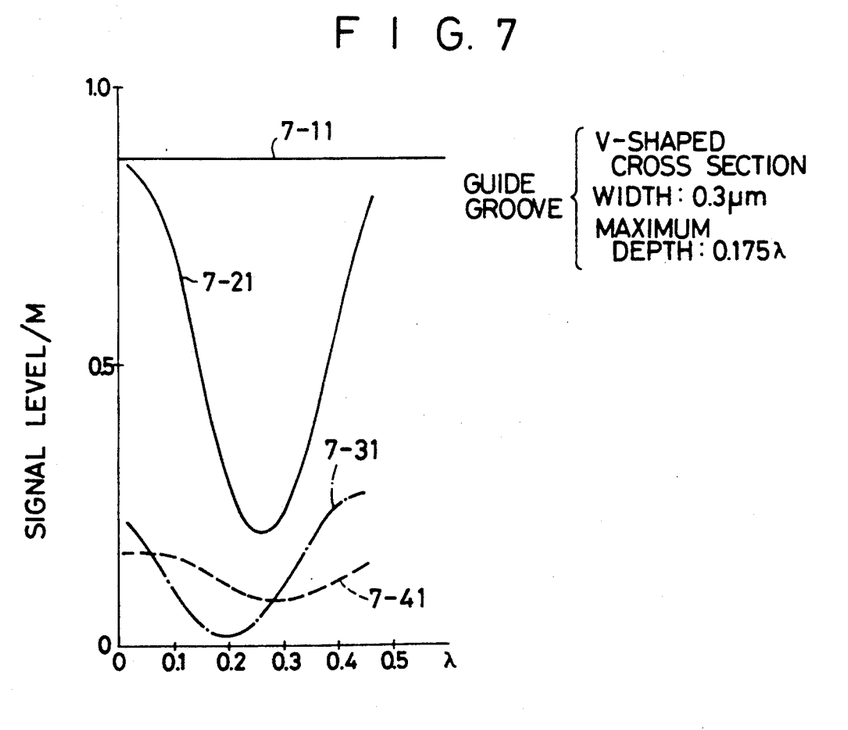
FIG. 7 is a graph showing signal levels produced from an optical information storage medium having guide grooves of a V-shaped cross section and pits of a rectangular cross section.

FIG. 7 illustrates how various signals vary in level if the depth of pits are changed in the range of from $0\lambda$ to $0.5\lambda$ with respect to an optical information storage medium having guide grooves of a V-shaped cross section having a width of 0.3 micrometer and a maximum depth of $0.175\lambda$ and pits of a rectangular cross section having a width of 0.55 micrometer. The curves 7-11, 7-21, 7-31, 7-41 represent an RF signal from the lands, an RF signal from the pits, a TP signal, and an offset value, as with the curves 6-11, 6-21, 6-31, 6-41 shown in FIG. 8(I). The tracking signal is stabilized in the pit depth range of from 0.26 to 0.45 $\lambda$. The pit depth should preferably range from $0.28\lambda$ to $0.38\lambda$ also in view of the contrast of the RF signals.

Where the guide grooves are of V-shaped in cross section, the tracking signal is maximum in the vicinity of $0.175\lambda$. The effective depth is however $0.125\lambda$, i.e., $0.175\lambda/1.4$. Although the effective depth of the guide grooves is optimum at $0.175\lambda$ for producing a tracking signal, it may practically be in the range of from $0.075\lambda$ to $0.20\lambda$.

The tracking signal can be detected particularly in the preformat area with a detecting error which is 1/1.2 to ⅓ of the conventional detecting error, since the tracking signals are of the same polarity in the guide grooves and the pits. The RF signals from the preformat area are not excessively large, thus reducing adverse effects on adjacent tracks.

Figure 9:
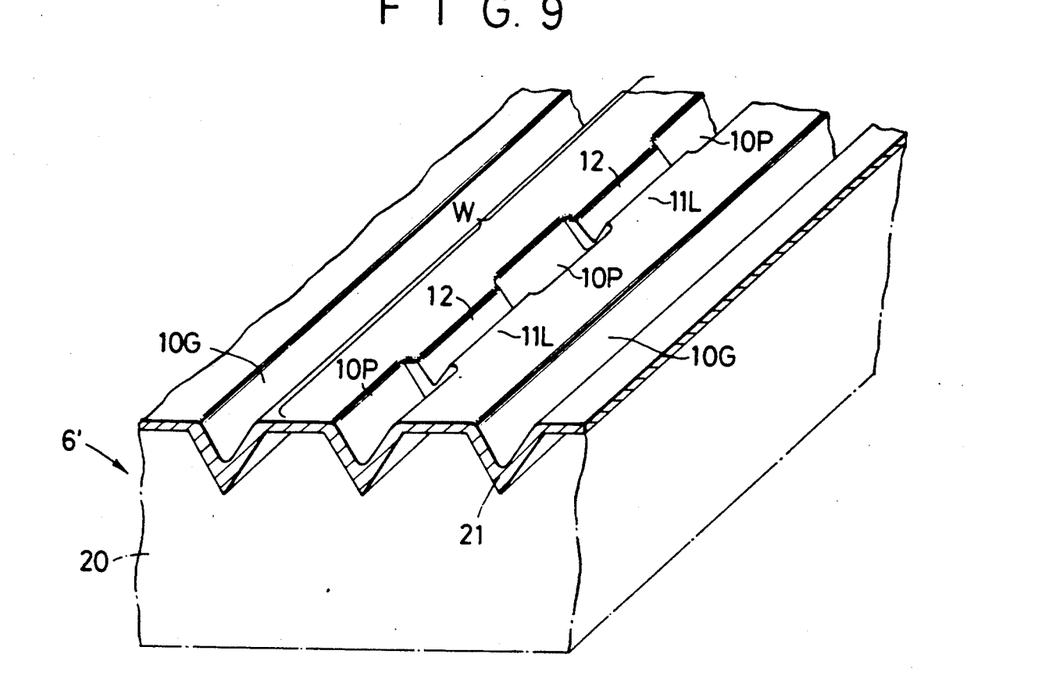
FIG. 9 is a fragmentary perspective view of an optical information storage medium according to a still further embodiment of the present invention.

FIG. 9 shows an optical information storage medium in the form of an optical disc 6' comprising a transparent substrate 20 made of PMMA and having a thickness of 1.15 mm, with guide grooves defined by photopolymerization, and a recording film 21 of a cyanine dye having an average thickness of 500 Å, the recording film 21 being coated on the transparent substrate 20. The optical information storage medium has a tracking guide grooves 10G and a preformat area W including lands 11L and pits 10P of a V-shaped cross section having a half width of 0.4 micrometer and a maximum depth of 0.175 $\lambda$, the preformat area W having a duty ratio of about 50%. The lands 11L have guide grooves 12 interconnecting the pits 10P and having a depth smaller than that of the pits 10P and a width identical to that of the pits 10P.

An experiment was effected on the optical disc 6' using an optical pickup or optical disc device similar to that shown in FIG. 14 and a semiconductor laser capable of emitting a laser beam of a wavelength of 790 nm. The results of the experiment are shown in FIG. 10.

Figure 10:
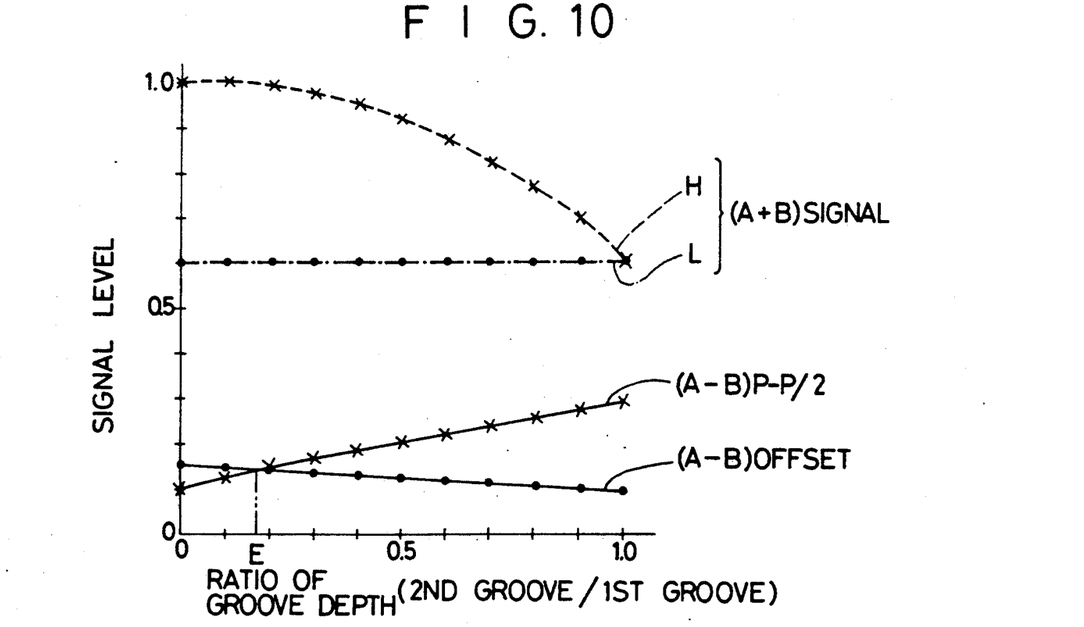
FIG. 10 is a graph illustrating signal levels generated from the optical information storage medium of FIG. 9.

FIG. 10 indicates a signal level with its intensity variable according to the ratio between the depth of the pits 10P (1st grooves) and the guide grooves 12 (2nd grooves). $(A-B)p-p/2$ represents ½ of the peak-to-peak amplitude or the level of a tracking error signal when the laser beam spot traverses the preformat area, i.e., and (A −B) OFFSET represents an offset value or the level of an error of the tracking error signal when the optical disc is tilted 1°. Where (A−B) OFFSET >(A−B)p-p/2, tracking control is impossible to make. Thus, (the depth of the guide grooves 12)/the depth of the pits 10P) must be greater than E. (A +B) SIGNAL indicates an information signal (RF signal). H of the (A +B) SIGNAL indicates the level of light reflected from the guide grooves 12, whereas L indicates the level of light reflected from the pits 10P. Therefore, the greater the difference between the levels H, L, the better the preformat signal. The ratio of the depth of the pits to the depth of the guide grooves while the levels H, L are differing from each other by a certain degree and (A−B)p-p/2 >(A−B) OFFSET should be in the range of about 0.2 to 0.7. Another experiment confirmed that the width of the guide grooves should be ⅓ to 1 times the width of the pits.

Unless the polarity of the tracking error signal produced by light reflected from the pits 10P is the same as the polarity of the tracking error signal produced by light reflected from the guide grooves 12, since the preformat area has a duty ratio of about 50%, i.e., the pits and the guide grooves alternate with each other, the produced tracking error signals would alternately be inverted in opposite polarities and would be cancelled by each other, resulting in a reduced average tracking error signal which would make tracking control unstable regardless of the existence of the guide grooves 12. To prevent this, the tracking error signals from the pits 10P and the guide grooves 12 must be of the same polarity.

Figure 11:
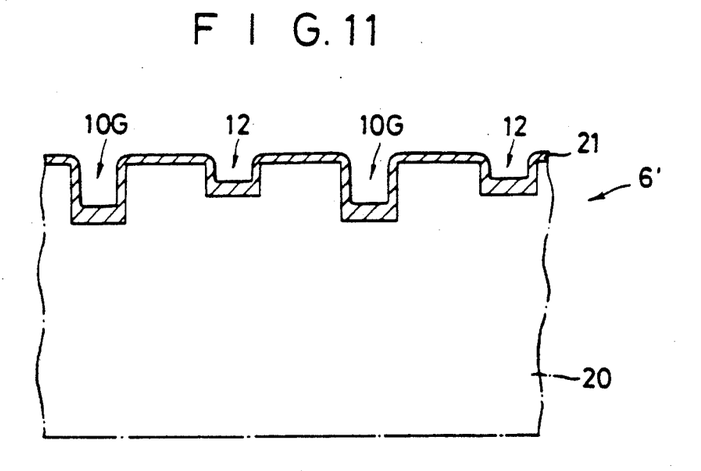
FIG. 11 is a fragmentary cross-sectional view of an optical information storage medium according to a still further embodiment of the present invention.

Experiments indicate that the polarity of a tracking error signal varies due to the depth of the grooves and configuration of dullness or bluntness, as follows:

Assuming that the laser beam has a wavelength of $\lambda$ in the transparent substrate 20, the polarity is inverted at each ¼ of the wavelength $\lambda$ where the grooves are of a rectangular cross section as shown in FIG. 11.

Figure 12:
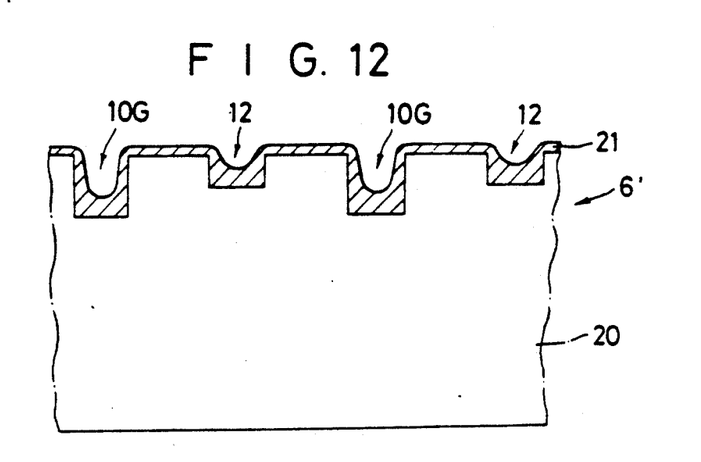
FIG. 12 is a fragmentary cross-sectional view of an optical information storage medium according to a still further embodiment of the present invention.

| Groove depth | Porality of tracking error signal |
|---|---|
| 0, 0.25, 0.5 | Zero |
| 0~0.25λ | Positive |
| 0.25λ−0.5λ | Negative |

Where the grooves have dull or blunt corners caused by application of the dye coated recording film 21 as shown in FIG. 12, the depth of the grooves should be increased 1 to 1.5 times the above values.

Recorded information was repeatedly reproduced from one track at a linear speed of 1.2 m/sec. with reproducing power of 0.2 mW. The results are given in the table below. It was confirmed that deterioration in the characteristics which tends to be caused by the conventional lands can be prevented by the guide grooves 12 which allow an increase in the thickness of the coated film 21.

| | Ratio of groove depth | Number of times of reproducibility |
|---|---|---|
| Conventional example | 0 | $10^6$ |
| Inventive example | 0.2 | $1.5 \times 10^6$ |
| Inventive example | 0.3 | $2 \times 10^6$ |
| Inventive example | 0.5 | $3 \times 10^6$ |

-continued

| | Ratio of groove depth | Number of times of reproducibility |
|---|---|---|
| Inventive example | 0.7 | $4 \times 10^6$ |

As described above, the guide grooves are defined in the lands of the preformat area, the guide grooves having an effective depth which is 0.2 to 0.7 times that of the pits, and a half width which is ⅓ to 1 times that of the pits, and the tracking error signals produced from the pits and the guide grooves being of the same polarity. With this arrangement, stable tracking can be achieved which keeping the information signal at a constant level. The number of times of reprocibility can largely be increased by preventing the optical recording layer or film from deteriorating.

Inventive and comparative examples will be described below. In each of the inventive and comparative examples, the effective depth of the pits is smaller than the effective depth of the guide grooves, the transparent substrate is made of PMMA and has a thickness of 1.15 mm, and the guide grooves and the preformat pits are defined by photopolymerization. The pitch of the guide grooves is 1.6 micrometers. The recording film is a coated film of cyanine dye which has an average thickness of 500A.

The cyanine dye has the following formula:

The coating was applied by dissolving the cyanine dye in dichloroethane and coating the solution with a spinner.

The preformat contained address information in each of the inventive and comparative examples. The preformat pits were therefore address pits.

The inventive and comparative examples were evaluated by reading data recorded on disc-shaped optical information storage media with the optical pickup as shown in FIG. 14. A data signal means an RF signal as described above.

The recording/reproducing laser beam H (FIG. 14) was emitted from a semiconductor laser at the wavelength of 790 nm. The objective lens 70 used had a numerical aperture of 0.47.

Tracking control was carried out by displacing the objective lens in a direction normal to the optical with an actuator (not shown) so that the tracking signal produced as (A−B) from the analog subtracter 90B will become zero.

The groove shape is a cross-sectional shape, and the groove depth is indicated by using the wavelength $\lambda$ of the laser beam in the transparent substrate (i.e., $\lambda o/n$ which is given by dividing the wavelength $\lambda o$ in vacuum by the refractive index n of the transparent substrate).

The trackable angle of inclination is the angle of inclination of the disc at which the address signal output is $\sqrt{2}/2$ times the normal signal. The signal output represents the percentage of a peak-to-peak amplitude when the level of light reflection from the mirror surface is 100%.

Nine inventive examples and two comparative examples are given in the following table:

|  | Guide groove | | | Address pit | | | Trackable angle of inclination (degrees) | Address sig. out. (%) | Data sig. out (%) |
|---|---|---|---|---|---|---|---|---|---|
|  | Groove shape | Max. depth (λ) | Half width (μm) | Groove shape | Max. depth (λ) | Half width (μm) |  |  |  |
| Inventive example 1 | Rectangular | 0.15 | 0.3 | Trapezoidal | 0.15 | 0.3 | 0.7 | 48 | 44 |
| Inventive example 2 | Rectangular | 0.15 | 0.3 | Trapezoidal | 0.13 | 0.3 | 0.8 | 35 | 44 |
| Inventive example 3 | Rectangular | 0.15 | 0.5 | Trapezoidal | 0.13 | 0.3 | 0.9 | 35 | 45 |
| Inventive example 4 | Rectangular | 0.15 | 0.6 | Trapezoidal | 0.14 | 0.35 | 1.0 | 35 | 45 |
| Inventive example 5 | Rectangular | 0.15 | 0.7 | Trapezoidal | 0.15 | 0.35 | 1.1 | 35 | 46 |
| Inventive example 6 | Trapezoidal | 0.2 | 0.5 | Trapezoidal | 0.15 | 0.35 | 1.1 | 36 | 47 |
| Inventive example 7 | Trapezoidal | 0.2 | 0.6 | Trapezoidal | 0.2 | 0.35 | 1.1 | 40 | 48 |
| Inventive example 8 | Trapezoidal | 0.25 | 0.7 | Trapezoidal | 0.2 | 0.4 | 1.0 | 42 | 47 |
| Inventive example 9 | Trapezoidal | 0.25 | 0.7 | Trapezoidal | 0.125 | 0.4 | 1.2 | 30 | 43 |
| Comparative example 1 | Rectangular | 0.125 | 0.3 | Rectangular | 0.25 | 0.3 | 0.7 | 73 | 52 |
| Comparative example 2 | V-shaped | 0.175 | 0.3 | Rectangular | 0.25 | 0.3 | 0.4 | 67 | 52 |

With the optical information storage medium thus constructed, the tracking signals from the pits and lands in the preformat area are not inverted in polarity, and hence good tracking control is made possible in the preformat area, rendering the optical information storage medium resistant to tilting or other disturbances. The amplitude of an address signal, for example, in the preformat area is slightly lower than that of the conventional optical information storage medium, thereby reducing crosstalk.

Where recorded information was reproduced from one track at a linear speed of 2.4 m/sec. with reproducing power of 0.3 mW, the number of times of reproducibility was 8 hundred thousands for the comparative example 2 and 200 8 millions for the inventive example 4. This means that the optical information storage medium of the invention is of better durability because of uniformity of the recording film due to the structure of the grooves.

Although certain preferred embodiments have been shown and described, it should be understood that many changes and modifications may be made therein without departing from the scope of the appended claims.

What is claimed is:

1. An optical information storage medium comprising:
   a transparent substrate having parallel, concentric, or helical tracking guide grooves defined in one surface thereof and information tracks which are positioned between the guide grooves, in the direction perpendicular to the grooves, and are arranged side-by-side a performat area composed of discrete pits and disposed on at least one of said information tracks, and a recording film capable of absorbing and reflecting light and disposed on said surface, said tracking guide grooves having an effective depth "d" which is 0.075 to 0.20 times the wavelength of a recording/reproducing laser beam in said transparent substrate;
   in which the depth "D" of said pits is 0.35 to 0.45 times said wavelength.

2. An optical information storage medium as in claim 1, in which the effective depth of said grooves is approximately 0.125 times said wavelength.

3. An optical information storage medium as in claim 2, in which the grooves in cross-section decrease in width at least over a part of the groove depth and have a maximum depth of approximately 0.175 times said wavelength.

4. An optical information storage medium as in claim 1 in which in cross-section the width of said guide grooves is substantially constant.

* * * * *